Figure 1:
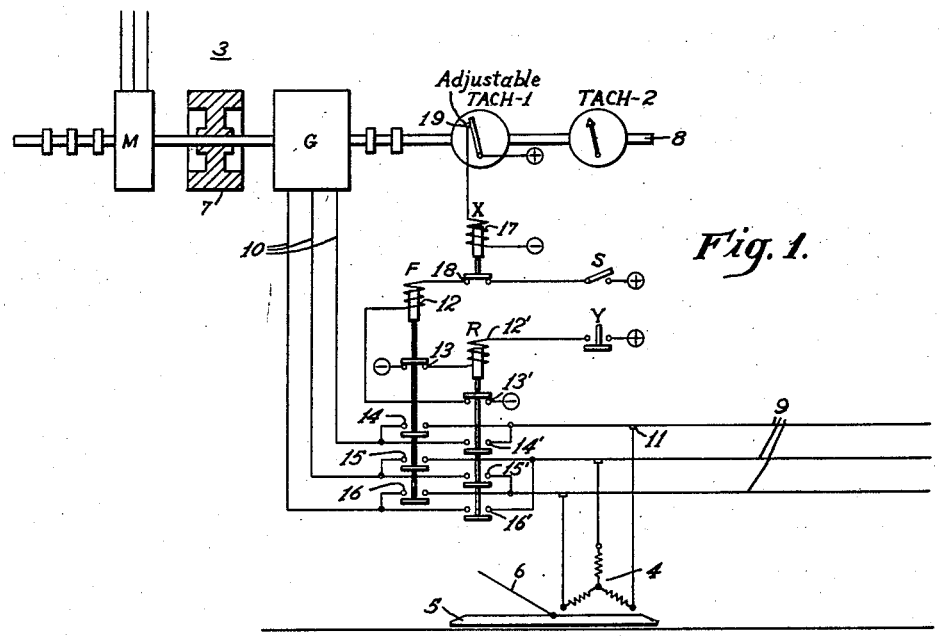

May 16, 1950      M. F. JONES      2,508,167

CONTROL SYSTEM

Filed May 26, 1944

WITNESSES:
Edward Michaels

INVENTOR
Maurice F. Jones.

BY O. B. Buchanan
ATTORNEY

Patented May 16, 1950

2,508,167

UNITED STATES PATENT OFFICE 2,508,167

CONTROL SYSTEM

Maurice F. Jones, Pittsburgh, Pa., assignor to Westinghouse Electric Corporation, East Pittsburgh, Pa., a corporation of Pennsylvania Application May 26, 1944, Serial No. 537,513

12 Claims. (Cl. 318—141)

My invention relates to means for energizing and controlling a self-propelled aircraft-launching electric towing-car.

In some types of aircraft-launching installations using self-propelled towing-cars, it is desirable to make the aircraft-launching accelerating-run as short as possible, so that a lightweight plane, for example, or a slow-speed plane, need not be towed all the way across the field before it is released for flight. The necessary accelerating-run takes some 6 seconds, more or less, and this time is so short that some kind of predetermined automatic cut-off control is generally regarded as essential. A direct response to the speed of the towing-car is a possible means for controlling the take-off instant at which the acceleration of the towing-car is interrupted, but this sort of control-means has the disadvantage of requiring an automatic response, at the control-station, to the quickly varying speed of a moving object at a considerable distance from the control-station.

Heretofore, the best known method and means for interrupting the accelerating-run has involved a preselection of the length of the run, and means for automatically terminating said run at a predetermined point in the runway, as set forth in an application of Frank B. Powers, Serial No. 473,843, filed January 1, 1943, or in an application of Ruel C. Jones, Serial No. 500,639, filed August 31, 1943, now Patent No. 2,412,514, issued December 10, 1946, both assigned to the Westinghouse Electric & Manufacturing Company.

An object of my present invention is to provide a more fundamental control-means for a towing-car catapult. A primary requisite for the take-off of an airplane of a given weight and design is the requirement that a certain amount of energy be expended in accelerating said airplane before the moment of actual take-off, when the plane leaves the ground.

It is a primary object of my present invention, therefore, to provide means for automatically discontinuing the accelerating run of the towing-car when a predetermined total amount of energy has been introduced into said towing-car for accelerating it during that particular accelerating-run. This energy-value is previously calculated, possibly with the aid of charts or tables, allowing a reasonable factor of safety, and taking into consideration the type and weight of the plane, the weather-conditions, and the amount of accelerating-energy which is contributed by the propeller-motors carried by the airplane itself.

A more specific object of my invention is to provide a power-plant having a large flywheel-effect and including a prime-mover, an adjustable speed-responsive device, and an electric generator for energizing the towing-car during its aircraft-launching accelerating-run, in combination with means for automatically terminating the run in response to a preselected power-plant speed which is predeterminedly lower than the power-plant speed at the commencement of the accelerating-run. Since the energy stored in the flywheel is proportional to the square of its speed, if the effective mass of the flywheel is known, the amount of energy which it gives up in slowing down from one speed to another is readily calculated, previous to any launching-operation. I contemplate that the major portion of the towing-car energy will be derived from the flywheel-effect of the power-plant. If the prime-mover of the power-plant contributes any material amount of energy during the accelerating run, this quantity can also be allowed for in predetermining the amount of flywheel energy which is to be transferred to the towing-car during the accelerating-run.

A further object of my invention is to provide a contact-making watthour-meter, or integrating wattmeter, or other adjustable electric energy-responsive device, which is responsive to the total amount of electric propelling-energy which is supplied to the towing-car from its electric energy-supplying means during any individual accelerating run, and to provide controlling-means for terminating each accelerating-run of the towing-car in response to a preselected total amount of said propelling-energy input.

With the foregoing and other objects in view, my invention consists in the methods, systems, combinations, apparatus and parts hereinafter described and claimed and illustrated in the accompanying drawing, wherein the two figures are diagrammatic views of circuits and apparatus illustrating two different forms of embodiment of my invention.

In Fig. 1, my invention is shown as being embodied in control-equipment for a power-plant 3 for energizing the propulsion-motor 4 of an aircraft-launching towing-car 5 having a suitable towing-cable 6. The power-plant 3 is illustrated as comprising any suitable prime mover which may be a three-phase induction-motor M, a large flywheel 7, a three-phase synchronous generator G, an adjustable contact-making minimum-speed tachometer TACH—1, and a speed-indicating tachometer TACH—2, all mounted on the prime-mover shaft 8.

The control-equipment includes forward and reverse switches F and R for energizing three-phase third-rail busses 9, in one phase-sequence or the other, from the output-terminals 10 of the generator G. Power is fed from the third-rail bus 9 to the towing-car motor 4 by means of suitable current-collecting shoes 11. The forward and reverse switches F and R are illustrated as electromagnetic contactor-switches, each having an energizing-coil 12, and an auxiliary back-contact 13, in addition to the three main contacts 14, 15 and 16 for the three-phase supply. The corresponding parts of the reversing switch R are distinguished by primed numerals. The control-equipment also includes a starting-switch S, for initiating the accelerating-run, and suitable interlocking switching means Y. The starting-switch S, and the associated forward and reverse power-switches F and R, constitute relatively stationarily located control-means, by which I mean that the control-means is stationary or non-movable with respect to the towing-car while the towing-car is moving, without intending to imply that the control-means may not be portable or movable independently of the towing-car.

In accordance with my invention, the control-equiment also comprises a speed-responsive switching-means, which is indicated, in Fig. 1, in the form of an auxiliary switch X having an energizing-coil 17 and a back-contact 18. The energizing-coil 17 of the auxiliary switch X is energized from an adjustable minimum-speed contact 19 of the contact-making tachometer TACH—1.

The control-circuits are shown only in a simple diagrammatic form, in Fig. 1, omitting many circuit-complicating features which would actually be utilized, as understood by control-engineers, but which do not contribute particularly to my present invention. The energization of the forward motor-switch F is controlled by the starting-switch S, in a circuit which is traceable from the positive bus (+), through the starting-switch S, the back-contact 18 of the auxiliary relay X, the operating-coil 12 of the forward-switch F, and the auxiliary back-contact 13' of the reverse-switch R, and thence to the negative bus (−). The control for the reverse-switch R is shown in a circuit which is traceable from the positive bus (+), through the auxiliary switch-interlock Y, the operating coil 12' of the reverse-switch R, and the auxiliary back-contact 13 of the forward-switch R, and thence to the negative bus (−).

In the operation of the system shown in Fig. 1, the flywheel 7 may be of such mass that, in being slowed down to 80% of its full speed, it will yield about 75% of the required energy-input into the towing-car motor 4. The motor M may be a wound-rotor induction motor, with suitable secondary control (not shown), and with a continuous rating of the order of 10% or 15% of the power needed to launch one plane. During the 6 seconds, more or less, required for launching a plane, the motor M may be momentarily overloaded, so that it will supply the remaining 25% of the total power necessary. It will be understood, of course, that these figures are only illustrative, and that I am not limited to these particular proportions. In fact, the initial speed of the power-plant, prior to the launching of any airplane, may be predetermined in accordance with the required amount of launching-energy.

In any event, a predetermination is made of the speed to which the prime mover must decelerate in order that its flywheel may contribute its necessary proportion of the total required towing-car energy, with a reasonable factor of safety. This predetermination may be made, either by calculation, or by the aid of charts or tables which are previously calculated. The adjustable contact 19 of the tachometer TACH—1 is then adjusted to the calculated speed to which the power-plant is to be reduced, during the launching, and the launching-switch S may then be closed whenever the operator is ready to launch the ship.

It will be noted that the apparatus shown in Fig. 1 is, in effect, a means for responding to some power-plant condition which is indicative of a preselected total amount of propelling-energy which is to be fed into the towing-car during any individual accelerating-run.

Figure 2:
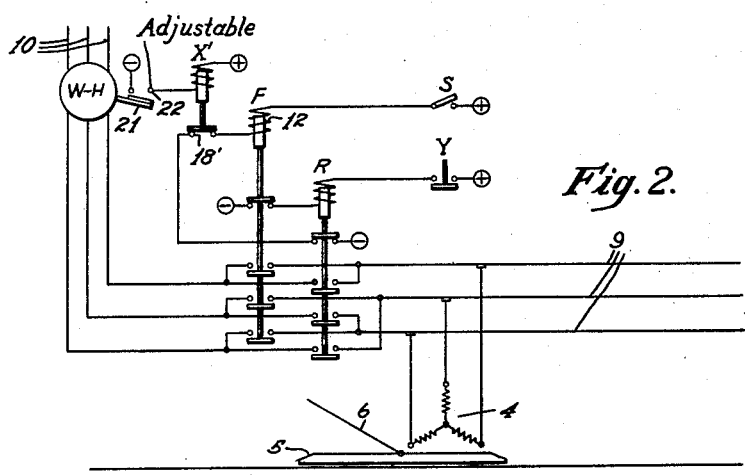

In Fig. 2, I have shown another means for responding to the total energy-input into the motor 4 of the towing-car 5. This energy-responsive means, in Fig. 2, is in the form of a watthour-meter W—H, which is intended to be illustrative of any integrating wattmeter or electric energy-responsive device, energized from the supply-leads 10 which energize the towing-car motor 4. The meter W—H is illustrated as having a contact-making arm 21, which makes contact with adjustable stationary contacts 22 when a predetermined amount of energy has been supplied by the electric energy-supplying bus 10.

The wattmeter contact 21—22 is utilized, in Fig. 2, to energize the auxiliary relay X' in the same manner that the tachometer-contact 19 was utilized for the energization of the auxiliary relay X in Fig. 1. In Fig. 2, the auxiliary relay X' has back-contacts 18' which are connected in series with the operating-coil 12 of the forward-switch F, in lieu of the contacts 18 in Fig. 1. The operation of the device shown in Fig. 2 is the same as has already been described in connection with Fig. 1, except for the means by which a preselection is made of the total amount of energy which is to be fed into the towing-car 5 during its accelerating-run. In Fig. 2, this totalized energy is determined by the adjustable watt-hour-meter W—H.

While I have illustrated my invention in only two illustrative forms of embodiment, I desire it to be understood that my invention is not limited to these two particular forms, or to the particular illustrative quantitative values which have been indicated, as the skilled workers of the art can make many changes of refinements, modifications, substitutions and additions, without departing from the broader principles of my invention. I desire, therefore, that the appended claims shall be accorded the broadest interpretation consistent with their language.

I claim as my invention:

1. A self-propelled aircraft-launching electric towing-car adapted to make preselected, forward, aircraft-launching accelerating-runs, towing-means associated with said towing-car and adapted to apply a launching-force to aircraft, electric drive-means adapted, when suitably energized, to feed forwardly propelling electric energy into the towing-car during its aircraft-launching accelerating-run, a power-plant including an electric generator adapted to controllably deliver a substantial proportion of the entire output of the power-plant to said electric drive-means for the towing-car, and control-means for controlling the supply of energy from said power-plant to said electric drive-means, said control-means including an adjustable selector-means for predetermining a preselected total amount of propelling-energy which is to be fed into the car by said power-plant during any individual accelerating-run, and circuit-means responsive to said selector-means and comprising switching-means adapted to terminate said accelerating-run of the towing-car.

2. A self-propelled aircraft-launching electric towing-car adapted to make preselected, forward, aircraft-launching accelerating-runs, towing-means associated with said towing-car and adapted to apply a launching-force to aircraft, electric drive-means adapted, when suitably energized, to feed forwardly propelling electric energy into the towing-car during its aircraft-launching accelerating-run, a power-plant having a large flywheel-effect and including a prime-mover, an adjustable speed-responsive device, and an electric generator adapted to controllably deliver a substantial proportion of the entire output of the power-plant to said electric drive-means for the towing-car during its aircraft-launching accelerating-run; and said electric circuit-means comprising controlling-means responsive to said speed-responsive device for terminating said accelerating-run of the towing-car in response to a preselected power-plant speed which is predeterminedly lower than the power-plant speed at the commencement of said accelerating-run.

3. A self-propelled aircraft-launching electric towing-car adapted to make preselected, forward, aircraft-launching accelerating-runs, towing-means associated with said towing-car and adapted to apply a launching-force to aircraft, electric drive-means adapted, when suitably energized, to feed forwardly propelling electric energy into the towing-car during its aircraft-launching accelerating-run, electric energy-supplying means adapted to feed forwardly propelling electric energy to said electric drive-means for the towing-car during its aircraft-launching accelerating-run, an adjustable electric energy-responsive device responsive to the total amount of propelling-energy input into the electric drive-means for the car during any individual accelerating-run, and controlling-means responsive to said electric energy-responsive device for terminating said accelerating-run of the towing-car in response to a preselected total amount of said propelling-energy input.

4. An electrically controlled system, comprising an electric motor, supply-means for feeding electric energy into said motor, starting-means for initiating the feeding of forward-driving energy from said supply-means into said motor for initiating a forward run of the motor in a predetermined direction, control-means for adjustably responding to a preselected total amount of energy fed into said motor from said supply-means during each run of the motor, and terminating-means for terminating said supply of forward-driving energy in response to a response of said control-means.

5. An electrically controlled system, comprising an electric motor, supply-means for feeding electric energy into said motor, said supply-means including a variable-speed electric generator having a large flywheel-effect, starting-means for initiating the feeding of forward-driving energy from said supply-means into said motor for initiating a forward run of the motor in a predetermined direction, control-means for adjustably responding to a preselected generator-speed which is predeterminedly lower than the generator-speed at the commencement of said forward run of the motor, and terminating-means for terminating said supply of forward-driving energy in response to a response of said control-means.

6. An electrically controlled system, comprising an electric motor, supply-means for feeding electric energy into said motor, starting-means for initiating the feeding of forward-driving energy from said supply-means into said motor for initiating a forward run of the motor in a predetermined direction, electric-meter control-means for adjustably responding to the total amount of forward-driving electric-energy input into the motor during each run of the motor, and terminating-means for terminating said supply of forward-driving energy in response to a response of said control-means.

7. An electrically controlled system, comprising an electrically driven self-propelling movable body, supply-means for feeding electric energy into said movable body, a relatively stationarily located power-switch means for controlling the energy fed from said supply-means into said movable body, starting means, associated with said power-switch means, for initiating the feeding of forward-driving energy from said supply-means to said movable body for initiating a forward run of said movable body in a predetermined direction, control-means for adjustably responding to a preselected total amount of energy fed into said movable body from said supply-means during said forward run, and terminating-means, associated with said power-switch means, for terminating said feeding of forward-driving energy in response to a response of said control-means.

8. An electrically controlled system, comprising an electrically driven self-propelling movable body, supply-means for feeding electric energy into said movable body, said supply-means including a variable-speed electric generator having a large flywheel-effect, a relatively stationarily located power-switch means for controlling the energy fed from said supply-means into said movable body, starting means, associated with said power-switch means, for initiating the feeding of forward-driving energy from said supply-means to said movable body for initiating a forward run of said movable body in a predetermined direction, control-means for adjustably responding to a preselected generator-speed which is predeterminedly lower than the generator-speed at the commencement of said forward run of the movable body, and terminating-means, associated with said power-switch means, for terminating said feeding of forward-driving energy in response to a response of said control-means.

9. An electrically controlled system, comprising an electrically driven self-propelling movable body, supply-means for feeding electric energy into said movable body, a relatively stationarily located power-switch means for controlling the energy fed from said supply-means into said movable body, starting means, associated with said power-switch means, for initiating the feeding of forward-driving energy from said supply-means to said movable body for initiating a forward run of said movable body in a predetermined direction, electric-meter control-means for adjustably responding to the total amount of forward-driving electric-energy input into the movable body during said forward run of the movable body, and terminating-means, associated with said power-switch means, for terminating said feeding of forward-driving energy in response to a response of said control-means.

10. The combination with a variable-voltage electric supply-means for feeding electric energy into a variably loaded load-circuit, of a power-switch means associated with said supply-means, starting-means, associated with said power-switch means, for initiating a period of energy-supply from said supply-means to said load-circuit, control-means for adjustably responding to a preselected total amount of energy fed into said load-circuit from said supply-means during said period of energy-supply, and terminating-means, associated with said power-switch means, for terminating said period of energy-supply.

11. The combination comprising an electric supply-means for feeding electric energy into a variably loaded load-circuit, said supply-means including a variable-speed electric generator having a large flywheel-effect, a power-switch means associated with said supply-means, starting-means, associated with said power-switch means, for initiating a period of energy-supply from said supply-means to said load-circuit, control-means for adjustably responding to a preselected generator-speed which is predeterminedly lower than the generator-speed at the commencement of said period of energy-supply, and terminating-means, associated with said power-switch means, for terminating said period of energy-supply.

12. The combination with a variable-voltage electric supply-means for feeding electric energy into a variably loaded load-circuit, of a power-switch means associated with said supply-means, starting-means, associated with said power-switch means, for initiating a period of energy-supply from said supply-means to said load-circuit, electric-meter control-means for adjustably responding to the total amount of electric energy fed into said load-circuit from said supply-means during said period of energy-supply, and terminating-means, associated with said power-switch means, for terminating said period of energy-supply.

MAURICE F. JONES.

REFERENCES CITED

The following references are of record in the file of this patent:

UNITED STATES PATENTS

| Number | Name | Date |
|---|---|---|
| 757,695 | Turbayne | Apr. 19, 1904 |
| 865,815 | Powell | Sept. 10, 1907 |
| 1,122,287 | Lincoln | Dec. 29, 1914 |
| 1,379,686 | Hanaff | May 31, 1921 |
| 1,869,212 | Peterson | July 26, 1932 |
| 1,940,349 | Haas | Dec. 19, 1933 |
| 2,240,947 | Wilson | May 6, 1941 |
| 2,404,964 | Jones | July 30, 1946 |
| 2,404,984 | Powers | July 30, 1946 |

FOREIGN PATENTS

| Number | Country | Date |
|---|---|---|
| 470,767 | Great Britain | Aug. 20, 1937 |
| 546,572 | Great Britain | July 20, 1942 |